(No Model.)

3 Sheets—Sheet 3

H. POWERS.
APPARATUS FOR SEPARATING ASBESTUS FROM CRUSHED ROCK.

No. 455,638.

Patented July 7, 1891.

WITNESSES:
Paul Johst
C. Sedgwick

INVENTOR.
H. Powers
BY Munn & Co
ATTORNEYS

UNITED STATES PATENT OFFICE.

HENRY POWERS, OF CRANBOURNE, CANADA.

APPARATUS FOR SEPARATING ASBESTUS FROM CRUSHED ROCK.

SPECIFICATION forming part of Letters Patent No. 455,638, dated July 7, 1891.

Application filed September 17, 1890. Serial No. 365,249. (No model.)

*To all whom it may concern:*

Be it known that I, HENRY POWERS, of Cranbourne, county of Dorchester, in the Province of Quebec and Dominion of Canada, have invented a new and Improved Apparatus for Separating Asbestus from Crushed Rock, of which the following is a full, clear, and exact description.

My invention relates to an improved apparatus for separating asbestus from crushed rock, and has for its object to provide means whereby rock containing short fiber and considered worthless may be manipulated in a simple economic manner, and all of the fiber contained therein expeditiously and effectually extracted, and a clean marketable article be obtained.

The invention consists in the novel construction and combination of the several parts of the apparatus, and in the novel steps of the process employed, as will be hereinafter fully set forth, and pointed out in the claims.

Reference is to be had to the accompanying drawings, forming a part of this specification, in which similar figures and letters of reference indicate corresponding parts in all the views.

Figure 1:
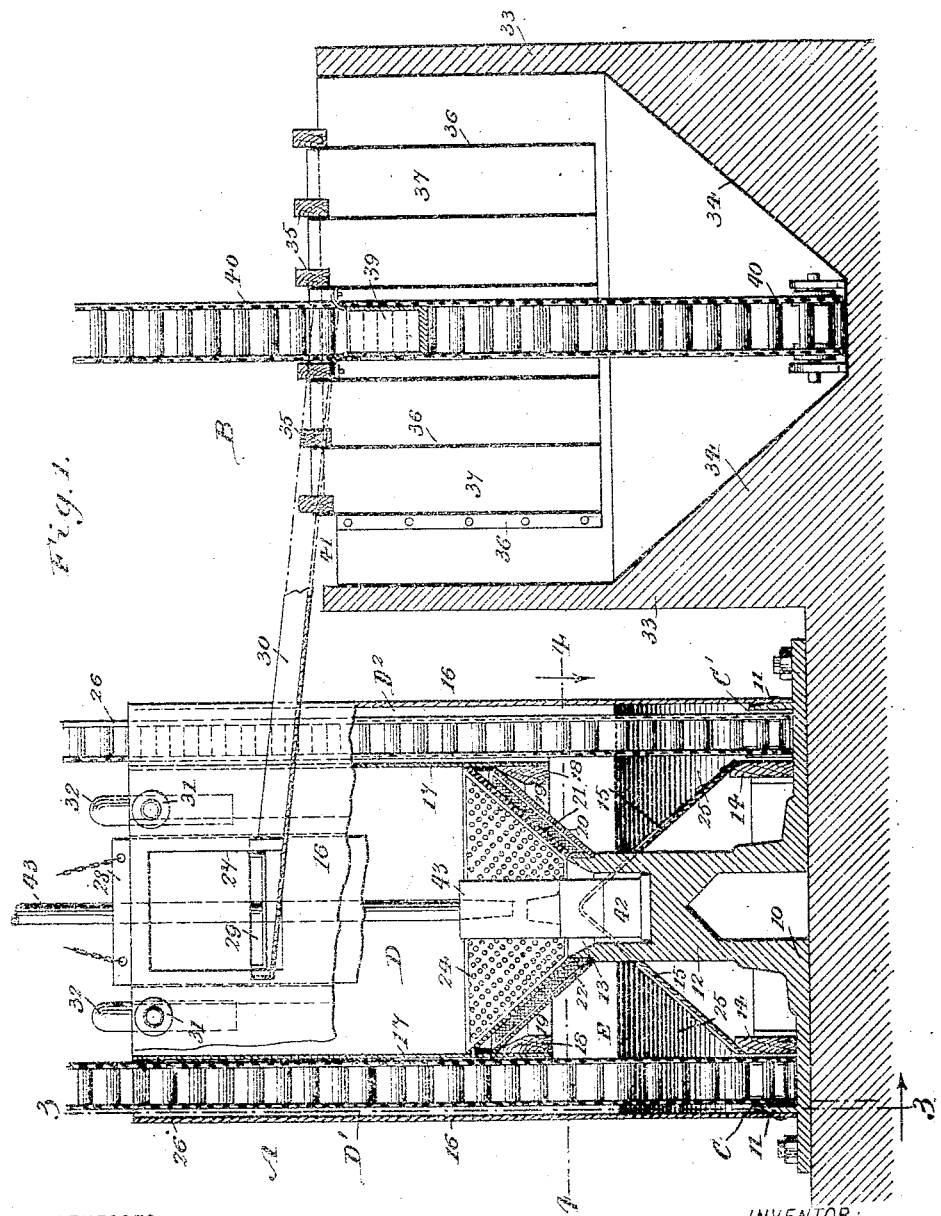
Figure 2:
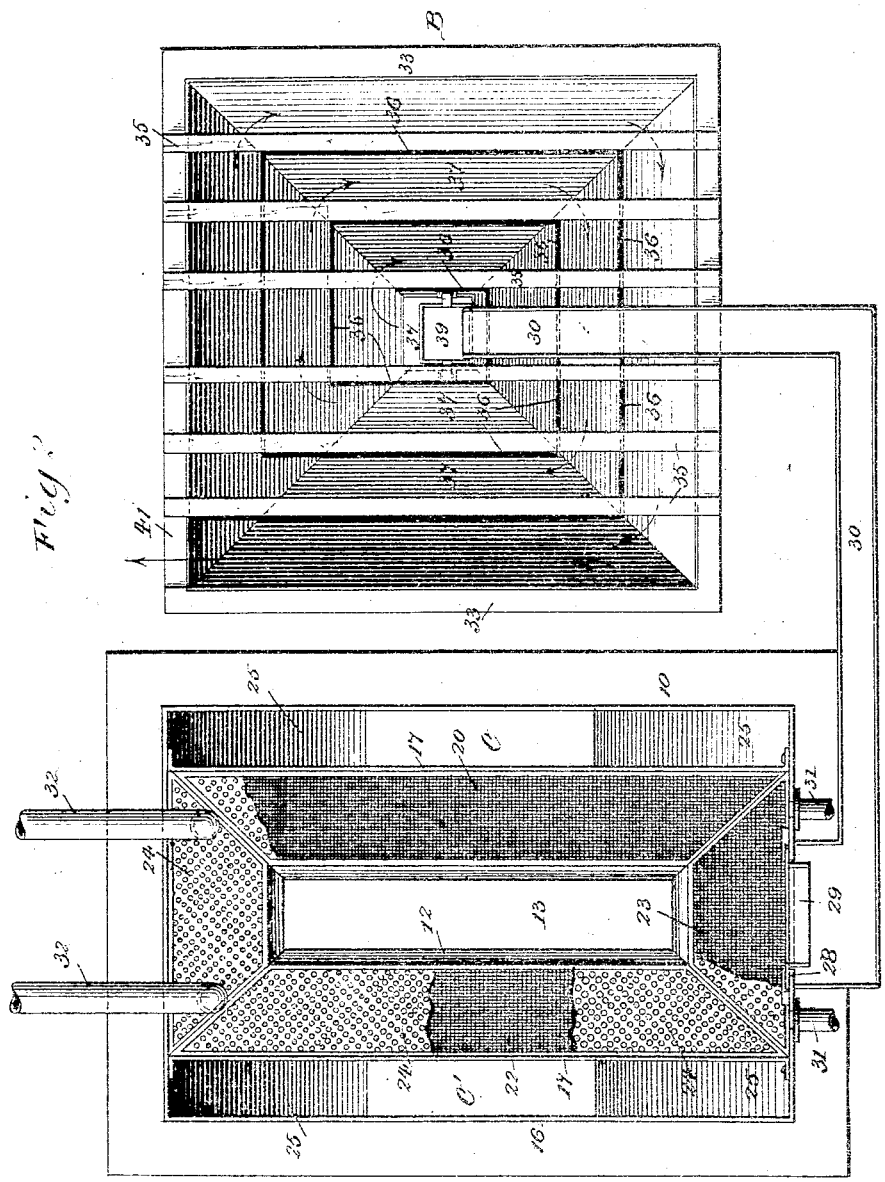
Figure 3:
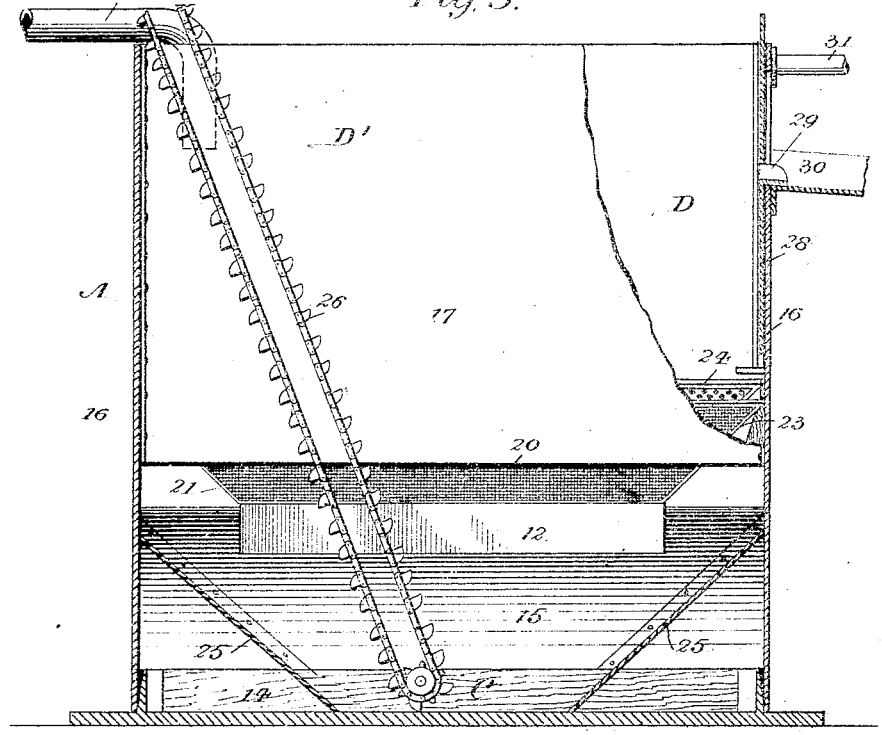
Figure 4:
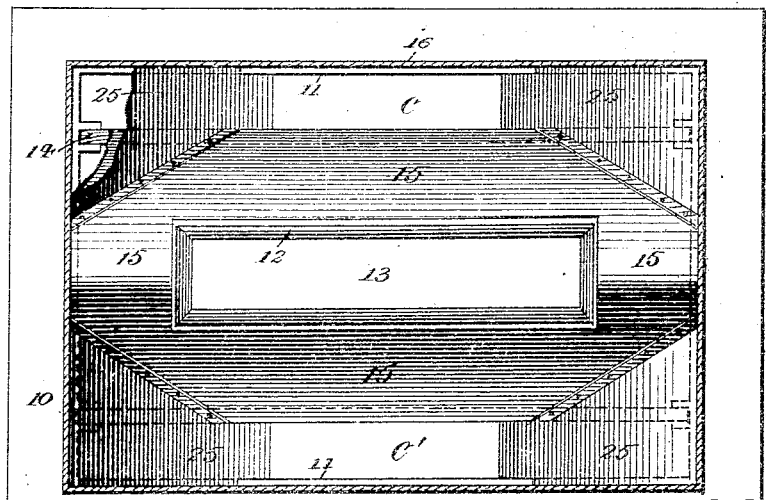

Figure 1 is a central vertical section through the apparatus, a portion of the front of the separator being in elevation. Fig. 2 is a plan view of the apparatus, a portion of the separator being in section, the elevators being omitted. Fig. 3 is a vertical section through the separator, taken on the line 3 3 of Fig. 1; and Fig. 4 is a horizontal section through the separator, the section being taken practically on the line 4 4 of Fig. 1.

The invention consists, primarily, in the novel construction of the separator A and the settler B. The base 10 of the separator is preferably rectangular in general contour, and is surrounded near its margin with an upright flange 11. At the center of the base a longitudinal bed-block 12 is located, which may constitute an integral portion thereof, if desired. The block is of less length than the base, and is provided in its upper portion with a compartment 13 open at the top, the upper surface of the compartment being beveled, as shown in Fig. 1.

Between each side flange and the bed-block a longitudinal partition 14 is secured to the base, extending from end to end and forming side chambers C and C'. The height of the partitions is preferably somewhat greater than the height of the flanges.

The upper chambered portion of the base-block is surrounded by a shed 15, essentially triangular in cross-section, the lower edges of which shed rest upon and are attached to the upper edges of the partitions 14, extending flush with their outer side faces. The shed usually consists of a sheet-metal plate, a casting or forging of a length equal to that of the base between the end flanges, which plate at its apex is provided with a longitudinal opening of sufficient size only to permit the plate to fit over the bed-block, and the walls of the opening may be flanged and the flanges secured to the block. From this construction it is obvious that any weighty substance overflowing from the compartment of the block will be guided entirely and directly to the side compartments C and C'.

The body of the separator consists of a metal jacket 16, conforming to the contour of the base and open at top and bottom. When the jacket rests properly upon the base, it engages with the outer faces of the base-flanges and is riveted, bolted, or otherwise secured thereto, the joint being a water-tight one.

Two partitions 17 are longitudinally secured in the jacket, one at each side of its center, forming thereby three compartments D, D', and D², the side compartments D' and D² being of equal width with the base compartments C and C'. The partitions 17, however, extend only a short distance below the center of the jacket, terminating at a point slightly above the level of the upper face of the bed-block, as best illustrated in Fig. 1. The inner lower surfaces of the partitions 17 have horizontal battens 18 secured thereto, which have a mortise or other closed connection with similar battens 19, secured to the inner end-surfaces of the jacket. Sieves 20, 21, 22, and 23 are employed within the jacket, producing a lower compartment E therein. These sieves rest at their lower edges in proper recesses produced in the sides and ends of the bed-block, and their upper edges are secured in any approved manner to the upper edges of the battens 18 and 19.

In order that the sieves may not be injured by the crushed rock which is introduced into the jacket compartment D, they are covered by perforated plates 24, which serve as shields. A space is made to intervene the sieves and the shields, as shown in Fig. 1, and the shields are preferably made to rest at their lower edges upon the upper edges of the bed-block, while their upper edges are secured to the jacket and its partitions 17.

The end walls of the chambers C and C' are inclined downward in the direction of their centers, and this is usually accomplished by fitting plates 25 in the said ends of the chambers, which plates have a bearing against the sides and ends of the jacket, the upper surface of the shed, and the side flanges and partitions 11 and 14, the lower ends of the plates being made to rest upon the floors of the chambers.

Two elevators 26 are employed in connection with the separator, one being located at each side, extending downward through the compartments D' and D² and the compartments C and C' below them, the position of the elevators in the lower compartments being at the center thereof, as shown in Fig. 3. The elevators may be of any approved construction, and consist, usually, of a box-like structure containing endless-chain belts having buckets applied thereto.

In the forward end of the jacket, near the top, an opening 27 is produced, covered by a vertically-sliding gate 28, which gate has produced therein a lipped opening 29, adapted for connection with any approved form of trough or chute 30, and in the front end of jacket, very near the top and at each side of the sliding gate, an outlet-pipe 31 is inserted. Water-inlet pipes 32 are carried over the rear end of the jacket and are curved downward to discharge into the central compartment thereof.

The settler B consists of a tank 33, having an open top and a bottom surface inclined or beveled from all sides downward to the center, as shown in Figs. 1 and 2. The tank is preferably of rectangular shape, as illustrated, but the shape may be varied, if in practice it is found desirable. Across the open top of the tank a number of preferably parallel beams 35 are located, to which beams the upper edge of a baffle-plate 36 is secured in any suitable or approved manner, the baffle-plate being bent inward upon itself to form a continuous serpentine channel 37, the contour of which channel is preferably made to correspond to the general contour of the tank. Between the opposed walls of the channel at its center a bucket 39 is suspended, which bucket is detachably secured to said walls, and in front of or at one side of the bucket an elevator 40 of like character with the elevators 26 is located, which elevator extends upward above the upper face of the tank and downward within the same, resting upon the bottom at the center thereof, as is best illustrated in Fig. 1.

The chute 30, connected with the lipped opening of the gate 28, is carried over the tank, which is of less height than the separator, in such manner that the contents of the chute will fall in the bucket 39. The side and end walls of the tank are of equal height, except upon one side between one of the end beams and the end of the tank, at which point the side is provided with a recess 41, the said recess constituting an overflow.

In operation the separator is filled with water, the water being constantly supplied thereto through the medium of the inlet-pipes 32, and the main outlet for the water is the lipped opening 29. The said opening, however, is not made sufficiently large to permit an amount of water to flow out of the separator equal to that delivered thereto. Consequently there is a constant pressure within the separator, and the surplus is made to find an exit through the outlet-pipes 31. The gate 28 by being raised or lowered lessens or makes greater the pressure upon the water flowing through the lipped opening 29, and the constant supply of water through the pipes 32 from the top of the separator creates an agitation therein. The rock containing the asbestus is crushed in any suitable machine, and the crushed rock is emptied into the central compartment D of the separator at the top. The said rock falls downward in the water upon the perforated plates 24, and is guided thereby into the chamber 13 of the bed-block. The said chamber is provided with dies 42, which are operated upon by any suitable or approved form of stamps 43, and through the medium of the stamps and dies 43 and 42 the crushed rock is pulverized to such an extent that the asbestus is freed therefrom and crushed sufficiently to cause the disintegration or separation of its fibers from each other. The sand or fine particles of rock by the constant agitation of the water is carried slightly upward and passes through the perforations of the plates 24 and through the screens beneath the plates over the shed 15 down into the base-chambers C and C', from whence the accumulated sand is removed by the elevators 26. The asbestus, which in the presence of still water would sink, but being crushed and disintegrated and under the influence of the agitated water in the separator is floated upward, and the tendency of the water being to find an exit through the lipped opening 29, the asbestus is carried outward through the same opening and delivered into the chute 30. The asbestus, when so delivered, is perfectly clean, being entirely free from any grit or particles of rock. The asbestus and water delivered to the chute from the separator pass off the end of the chute and drop into the bucket 39. The settler is also filled with water, the overflow being, as heretofore stated, at 41. The water in the settler, however, is still and is kept in this state by reason of the supply from the chute 30 emptying into the bucket 39, and the water and asbestus consequently flow from the top of the bucket without agitation and mingle with the water contained in the settler, and as there is a mild current at all times in the settler, due to the supply at the bucket and the outlet at the recess 41, the asbestus and water delivered to the settler flow through the serpentine channel 37, and in flowing, as the water, as heretofore stated, is nearly still, the asbestus by gravity sinks to the bottom of the settler, and is constantly removed therefrom by the elevator 40. In this manner all of the rock containing short fiber and heretofore considered as a waste product may be manipulated to thoroughly and expeditiously as well as economically remove all of the asbestus, which after leaving the settler may be placed in any form of baling-press and pressed or compressed, as may be found desirable.

Having thus described my invention, I claim as new and desire to secure by Letters Patent—

1. The herein-described method of separating asbestus from rock, which consists in simultaneously pulverizing the rock and crushing the asbestus therein to cause the disintegration thereof into separate fibers in an agitated body of water having an upward current to float off said fibers, the pulverized rock sinking in the water, substantially as set forth.

2. An apparatus of the character described, comprising a water-chamber having a transverse screen dividing it into an upper and a lower compartment, a pulverizing-stamp operating in the upper compartment, and means for effecting an upward flow of water through said chamber to float off the asbestus fibers, substantially as set forth.

3. An apparatus of the character described, comprising a water-chamber having a funnel-shaped screen dividing it into an upper and a lower compartment, a pulverizing-stamp encircled by said screen, a water-inlet discharging into said chamber, and a water-outlet near the upper end of the chamber of less area than the water-inlet and through which the asbestus fibers are floated, the crushed rock falling through the said screen into the lower compartment, substantially as set forth.

4. An apparatus of the character described, comprising the water-chamber having a screen dividing it into an upper and a lower compartment, a pulverizing-stamp encircled by said screen, a funnel-shaped foraminated shield above the screen and discharging into the stamp, and a water supply and outlet adapted to cause an upward flow through the chamber to float off the asbestus fibers but permit the pulverized rock to fall through the screen into the lower compartment, substantially as set forth.

5. An apparatus of the character described, comprising the water-chamber having a screen dividing it transversely into an upper and lower compartment, a funnel-shaped foraminated shield above the screen, a pulverizing-stamp encircled by the screen and into which the shield discharges, a water supply and outlet at the upper end of the chamber to cause an upward flow therethrough to float off the asbestus fibers, and an elevator to remove the pulverized rock from the lower compartment as it falls thereinto through the screen, substantially as set forth.

6. An apparatus of the character described, comprising a water chamber or reservoir having a transverse screen dividing it into an upper and a lower compartment, a pulverizing-stamp encircled by the screen, the screen permitting the pulverized rock to pass therethrough, but preventing the passage of the disintegrated asbestus, a water supply and outlet adapted to cause an upward flow through the chamber to float off the said fibers, a chute or conduit receiving the water and fiber, and a settling-chamber, into which the chute discharges.

7. In an apparatus of the character described, a stamp, a chamber or reservoir in which the stamp is located, having a water-outlet near the top of less area than the water-inlet, and a chute leading from said outlet, and a settling-chamber to which said chute leads provided with a water-outlet and a water-receiving vessel, as and for the purpose set forth.

8. In an apparatus of the character described, a stamp, a chamber or reservoir in which the stamp is located, having a water-outlet near the top of less area than the water-inlet, a settling-chamber provided with a baffle-plate bent inward to form a serpentine channel, a receptacle suspended in the center of the channel, and a sluice-connection between the water-outlet from the stamp and the suspended receptacle of the settling-chamber, as and for the purpose set forth.

9. In an apparatus of the character described, a separator comprising a jacket the base of which is provided with a chambered bed-block, screens engaging with the jacket and surrounding the block, a stamp operating in the bed-block to pulverize the rock and disintegrate the asbestus into fibers, compartments at the sides of the block, and an inclined shed leading to the said compartments, and a water inlet and outlet at the upper end of the jacket to cause an upward flow of water therethrough to float off the asbestus fibers, substantially as shown and described.

10. In an apparatus of the character described, a separator comprising a jacket the base of which is provided with a chambered bed-block, inclined screens engaging with the jacket and surrounding the block, a stamp operating in the bed-block to pulverize the rock and disintegrate the asbestus into fibers, compartments below the screens at the sides of the block, an inclined shed leading to the said compartments, and elevators located in the said compartments, and a water inlet and outlet at the upper end of the jacket to cause an upward flow of water therethrough to float off the asbestos fibers, substantially as and for the purpose specified.

11. In an apparatus of the character described, a separator comprising a jacket the base of which is provided with a chambered bed-block, screens engaging with the jacket and surrounding the block, perforated shields located above the screens, an inclined shed surrounding the block below the screens, and compartments at the base of the shed, as and for the purpose specified.

12. In an apparatus of the character described, a separator comprising a jacket the base of which is provided with a chambered bed-block, compartments formed at the sides of the block, screens surrounding the block, an inclined shed located beneath the screens and leading to the compartments, and stamps located within the jacket, the said stamps being held to reciprocate to and from the bed-block, as and for the purpose specified.

13. In an apparatus of the character described, the combination, with a separator comprising a jacket adapted to contain water and having an outlet of less area than its inlet, and a stamp-mill located within the jacket, of screens surrounding the mill, a settling-chamber provided with a suspended receptacle, and a sluice-connection between the outlet of the separator and the receptacle of the settler, as and for the purpose specified.

14. In an apparatus of the character described, the combination, with a separator comprising a jacket having a water-inlet and an adjustable water-outlet of less area than the inlet, both the inlet and outlet being located near the top of the jacket, a stamp-mill located within the jacket, and screens surrounding the mill and engaging with the jacket, of shields located above the screens, a settling-chamber provided with a serpentine channel, a water-outlet and a suspended receptacle, and a sluice-connection between the suspended receptacle and the outlet of separator, substantially as and for the purpose specified.

15. In an apparatus of the character described, the combination, with a separator consisting of a jacket containing a stamp-mill and provided with a water-inlet near its upper end at one side, and a water-outlet near the upper end at the opposite side, the said water-outlet being of less area than the inlet, and overflow-openings above the outlet, screens located around the stamp-mill, an inclined shed beneath the screens, chambers formed at each side of the shed, and elevating mechanism connected with the chambers, of a settler, a sluice-connection between the outlet of the separator and the settler, and an elevating apparatus located in the settler, as and for the purpose set forth.

16. In an apparatus of the character described, a settler consisting of a tank having an inclined bottom and an upper water-outlet, a baffle-plate suspended in the tank and bent to form a serpentine channel, and a receiving-receptacle suspended between the walls of the baffle-plate, as and for the purpose specified.

17. In an apparatus of the character described, a settler consisting of a tank provided with a bottom inclined from the sides and ends to the center, a baffle-plate suspended within the tank above its bottom, the said plate being curved inward to form a serpentine channel, a receiving-receptacle suspended between the walls of the baffle-plate near the center thereof, and an elevating mechanism having connection with the bottom of the tank, as and for the purpose specified.

HENRY POWERS.

Witnesses:
J. FRED. ACKER,
EDGAR TATE.